United States Patent
Yoo

(10) Patent No.: US 9,219,440 B2
(45) Date of Patent: Dec. 22, 2015

(54) APPARATUS FOR ESTIMATING PARAMETER IN INDUCTION MOTOR

(71) Applicant: LSIS CO., LTD., Anyang-si, Gyeonggi-do (KR)

(72) Inventor: Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 113 days.

(21) Appl. No.: 13/975,050

(22) Filed: Aug. 23, 2013

(65) Prior Publication Data

US 2014/0062380 A1    Mar. 6, 2014

(30) Foreign Application Priority Data

Sep. 4, 2012 (KR) .......................... 10-2012-0097435

(51) Int. Cl.
*H02P 21/00* (2006.01)
*H02P 21/14* (2006.01)

(52) U.S. Cl.
CPC .......... *H02P 21/0039* (2013.01); *H02P 21/145* (2013.01); *H02P 2207/01* (2013.01)

(58) Field of Classification Search
USPC .......................... 318/400.1, 400.32, 798, 801
See application file for complete search history.

(56) References Cited

U.S. PATENT DOCUMENTS

| | | | | |
|---|---|---|---|---|
| 5,998,958 A | * | 12/1999 | Lee ...................... | G01R 31/343 318/801 |
| 2009/0021208 A1 | * | 1/2009 | Romenesko .......... | H02P 21/145 318/807 |
| 2011/0084638 A1 | * | 4/2011 | Patel ...................... | B60K 1/02 318/400.32 |
| 2011/0285342 A1 | * | 11/2011 | Campbell ............. | H02P 21/145 318/798 |

FOREIGN PATENT DOCUMENTS

| | | |
|---|---|---|
| CN | 102255599 | 11/2011 |
| JP | 1-194883 | 8/1989 |
| JP | 9-19199 | 1/1997 |
| JP | 2002-300799 | 10/2002 |

OTHER PUBLICATIONS

Japan Patent Office Application Serial No. 2013-181114, Office Action dated Jul. 22, 2014, 4 pages.
The State Intellectual Property Office of the People's Republic of China Application Serial No. 201310397974.3, Office Action dated Jul. 14, 2015, 6 pages.

* cited by examiner

*Primary Examiner* — Shawki S Ismail
*Assistant Examiner* — Muhammad S Islam
(74) *Attorney, Agent, or Firm* — Lee, Hong, Degerman, Kang & Waimey

(57) ABSTRACT

An apparatus for estimating a parameter of an induction motor is provided. The estimating apparatus receives an output from a current controller and d and q-axis currents in a synchronous reference frame applied to an induction motor, calculates an error of rotor resistance, and obtains a difference between the rotor resistance and nominal rotor resistance.

5 Claims, 3 Drawing Sheets

APPARATUS FOR ESTIMATING PARAMETER IN INDUCTION MOTOR

CROSS-REFERENCE TO RELATED APPLICATION

Pursuant to 35 U.S.C. §119(a), this application claims the benefit of earlier filing date and right of priority to Korean Application No. 10-2012-0097435, filed on Sep. 4, 2012, the contents of which is incorporated by reference herein in its entirety.

BACKGROUND OF THE INVENTION

1. Field of the Invention

The present disclosure relates to an apparatus for estimating a parameter of an induction motor in real time.

2. Background of the Invention

In general, a general-purpose inverter is commonly used to drive 3-phase induction motor, and in particular, a general-purpose inverter is commonly used in a variable speed driving field using an induction motor, a hoisting load, or a traction load of an electric vehicle, Among parameters of an induction motor, stator resistance and rotor resistance values are changed when a temperature within the induction motor is changed according to a change in a load. Vector control commonly used as an induction motor driving method is significantly dependent upon a motor parameter, so fluctuation of the rotor resistance degrades control performance. This will be described with reference to the accompanying drawings.

FIG. 1 is a view illustrating a configuration of a related art system for controlling an induction motor.

A speed controller 110 receives a rotor speed reference an actual rotor speed and outputs a q-axis current reference in a synchronous reference frame. A current controller 120 outputs d and q-axis voltages in the synchronous reference frame from d and q-axis current references in the synchronous reference frame and an actual current.

A first converting unit 130 converts output voltages from the current controller 120 into voltages in a stationary reference frame, and a second converting unit 140 converts phase currents from an induction motor 160 measured by current sensors 190a, 190b, and 190c into d and q-axis currents in the synchronous reference frame.

An inverter 150 applies voltages to the induction motor 160. A rotor position detecting unit 170 measures a speed of a rotor of the induction motor 160. A magnetic flux angle calculating unit 180 calculates a magnetic flux angle by using the speed of the rotor measured by the rotor position detecting unit 170 and the d and q-axis currents in the synchronous reference frame, and in this case, the d-axis current in the synchronous reference frame may be replaced by a d-axis current reference.

FIG. 2 is a view illustrating a detailed configuration of the speed controller in FIG. 1.

As illustrated in FIG. 2, the speed controller 110 outputs a difference between a reference speed (or speed reference) and an actual speed (or a feedback speed), as a q-axis current reference by using proportional-integral controllers 111a and 111b. A limiter 112 limits an output from the speed controller 110, and a gaining unit 113 provides an anti-windup gain to prevent divergence of the integrator 111b when the limiter 112 operates.

FIGS. 3A and 3B are views illustrating detailed configurations of the current controller in FIG. 1, respectively. Specifically, FIG. 3A is a view illustrating a d-axis current controller in the synchronous reference frame, and FIG. 3B is a view illustrating a configuration of a q-axis current controller in the synchronous reference frame. As illustrated, in order to control d and q-axis currents in the synchronous reference frame, the d and q-axis current controllers include proportional and integral-type controllers 121a and 121b, and 124a and 124b, and feed-forwarding units 122 and 125, respectively.

The feed-forwarding units 122 and 125 may be variously configured according to modeling of an induction motor. When an output from the current controller exceeds a magnitude of a voltage for the inverter to synthesize it, gaining units 123 and 126 provide an anti-windup gain to prevent divergence of integral controllers 121b and 124b.

An operation of the related art apparatus for controlling an induction motor will be described.

The first converting unit 130 converts voltages in a synchronous reference frame, as outputs from the current controller 120, into voltages in a stationary reference frame, which may be expressed as follows.

$$V_{ds}^{s} = V_{ds}^{e^{*}}\cos\theta_{e} - V_{qs}^{e^{*}}\sin\theta_{e} \quad \text{[Equation 1]}$$

$$V_{qa}^{s} = V_{ds}^{e^{*}}\sin\theta_{e} + V_{qs}^{e^{*}}\cos\theta_{e} \quad \text{[Equation 2]}$$

The second converting unit 140 obtains d and q-axis currents in the synchronous reference frame from phase currents of the induction motor 160 measured by the current sensor 190, which may be expressed as follows.

$$i_{ds}^{s} = \frac{2i_{as} - i_{bs} - i_{cs}}{3} \quad \text{[Equation 3]}$$

$$i_{qs}^{s} = \frac{i_{bs} - i_{cs}}{\sqrt{3}} \quad \text{[Equation 4]}$$

$$i_{ds}^{e} = i_{ds}^{s}\cos\theta_{e} + i_{qs}^{s}\sin\theta_{e} \quad \text{[Equation 5]}$$

$$i_{qs}^{e} = -i_{ds}^{s}\sin\theta_{e} + i_{qs}^{s}\cos\theta_{e} \quad \text{[Equation 6]}$$

The magnetic flux angle calculating unit 180 obtains magnetic flux angles required for angle conversion of the first converting unit 130 and the second converting unit 140, and here, in case of performing indirect vector control, the magnetic flux angles may be obtained as follows.

$$\omega_{sl} = \frac{R_r}{L_r}\frac{i_{qs}^{e}}{i_{ds}^{e^{*}}} \quad \text{[Equation 7]}$$

$$\omega_e = \frac{P}{2}\omega_r + \omega_{sl} \quad \text{[Equation 8]}$$

$$\theta_e = \int \omega_e d\tau \quad \text{[Equation 9]}$$

Here, $\omega_{sl}$ is a slip frequency, $L_r$ is rotor inductance, $R_r$ is rotor resistance, and P is a number of poles.

Meanwhile, in case of performing indirect vector control, rotor resistance is required to obtain a slip frequency by using Equation 7. However, the related art apparatus for controlling an induction motor illustrated in FIG. 1 does not estimate a parameter in real time, which is, thus, vulnerable to a change in a parameter. In particular, a value of rotor resistance of the induction motor 160 is changed according to a change in temperature of the induction motor 160, and a temperature of the induction motor is affected by a change in a load. An error in resistance of a stator occurring in such an environment degrades performance of current control.

SUMMARY OF THE INVENTION

Therefore, an aspect of the detailed description is to provide an apparatus for estimating a parameter of an induction motor capable of enhancing vector control performance by estimating a change in a parameter of an induction motor in real time.

To achieve these and other advantages and in accordance with the purpose of this specification, as embodied and broadly described herein, an apparatus for estimating a parameter of an induction motor including a current controller outputting d and q-axis voltages in a synchronous reference frame from d and q-axis current references and d and q-axis currents in the synchronous reference frame applied to the induction motor and a magnetic flux angle calculating unit calculating a magnetic flux angle by using d and q-axis currents in the synchronous reference frame applied to the induction motor and a rotor speed of the induction motor, in a control system includes a state estimator configured to calculate an error of rotor resistance upon receiving an output from the current controller and the d and q-axis currents in the synchronous reference frame applied to the induction motor; and an integral controller configured to obtain a difference between the rotor resistance output from the state estimator and nominal rotor resistance.

In an embodiment of the present invention, the apparatus may further include: a calculating unit configured to calculate stator resistance from an output from the integral controller.

In an embodiment of the present invention, the calculating unit may calculate stator resistance by using the following equation.

$$R_s = \frac{M}{\tilde{i}_{ds}^e} - (\hat{R}_r + \Delta R_{r\_comp})\frac{L_m^2}{L_r^2}$$

$$R_s = \frac{N}{\tilde{i}_{qs}^e} - (\hat{R}_r + \Delta R_{r\_comp})\frac{L_m^2}{L_r^2}$$

Here, $R_s$ is stator resistance, $R_r$ is rotor resistance, $$M = \frac{K_I}{s}(i_{ds}^{e*} - \tilde{i}_{ds}^e), N = \frac{K_I}{s}(i_{qs}^{e*} - \tilde{i}_{qs}^e),$$

and $\Delta R_{r\_comp}$ are outputs from the integral controller, $L_m$ is inductance of the induction motor, and $L_r$ is rotor inductance.

In an embodiment of the present invention, the apparatus may further include a switch configured to switch as to whether to estimate rotor resistance according to a flag input.

In an embodiment of the present invention, the output from the integral controller may be updated by the current controller and the magnetic flux angle calculating unit.

According to embodiments of the present invention, the system for controlling an induction motor estimates a parameter of the induction motor in real time and reflects it in a control operation, thus enhancing performance of vector control.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

Hereinafter, embodiments according to the present invention will be described in detail with reference to the accompanying drawings.

Figure 4:
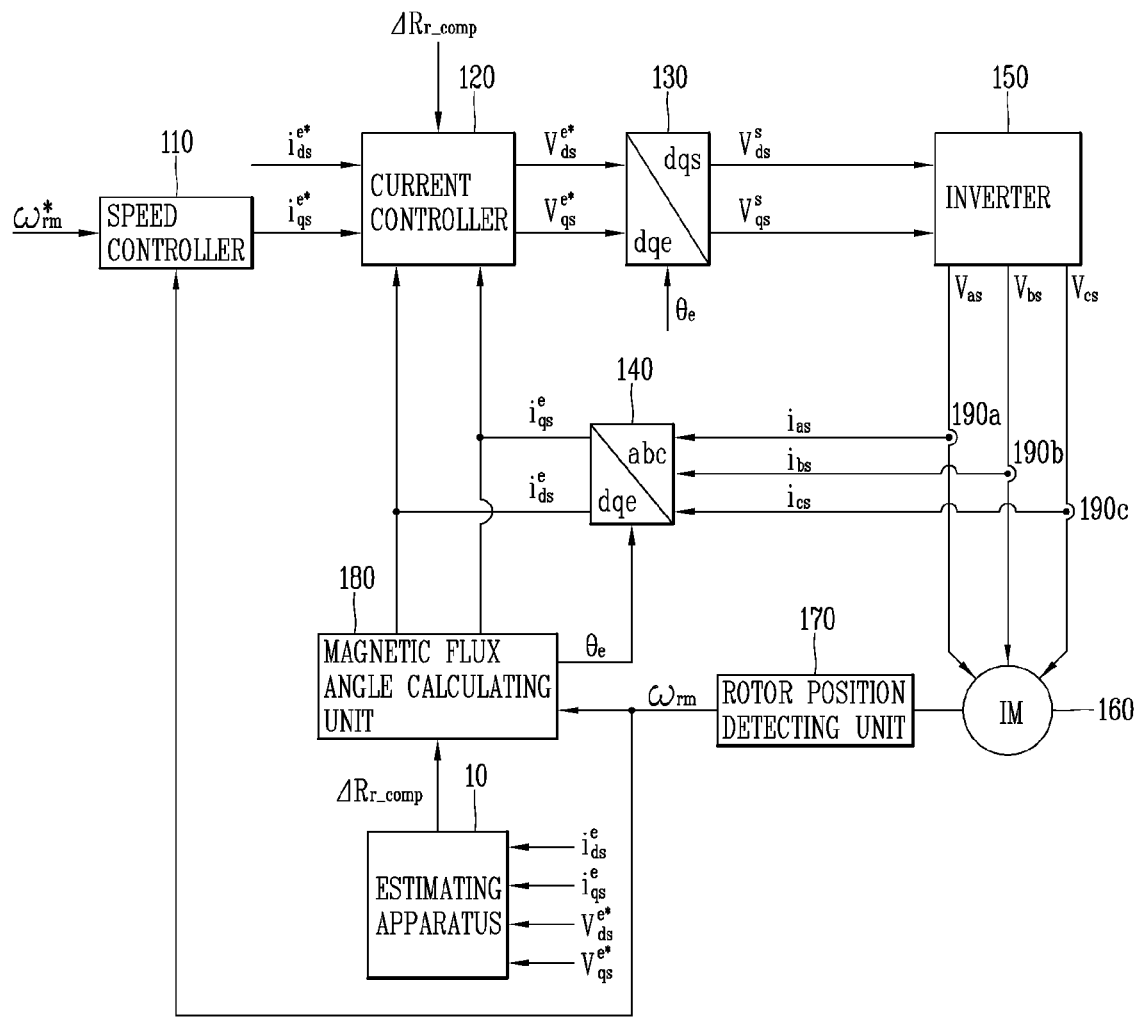
FIG. 4 is a view illustrating an embodiment of a system for controlling an induction motor to which the present invention is applied.

FIG. 4 is a view illustrating an embodiment of a system for controlling an induction motor to which the present invention is applied.

Figure 1:
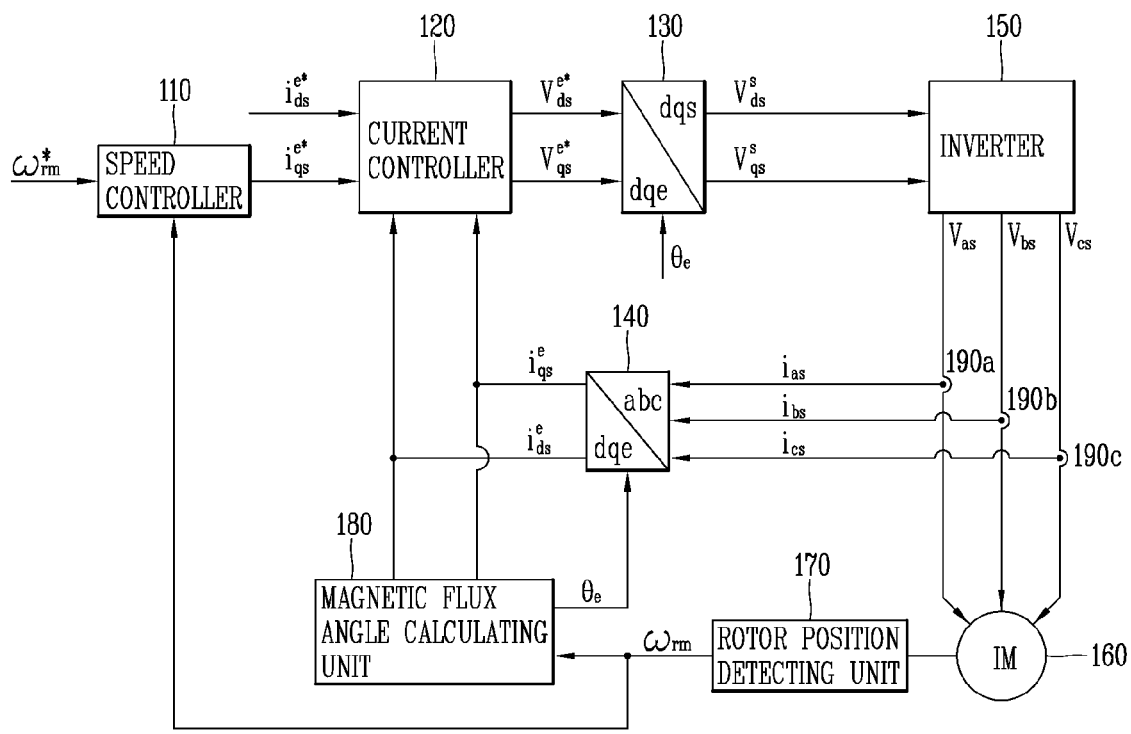
FIG. 1 is a view illustrating a configuration of a related art system for controlling an induction motor.
Figure 2:
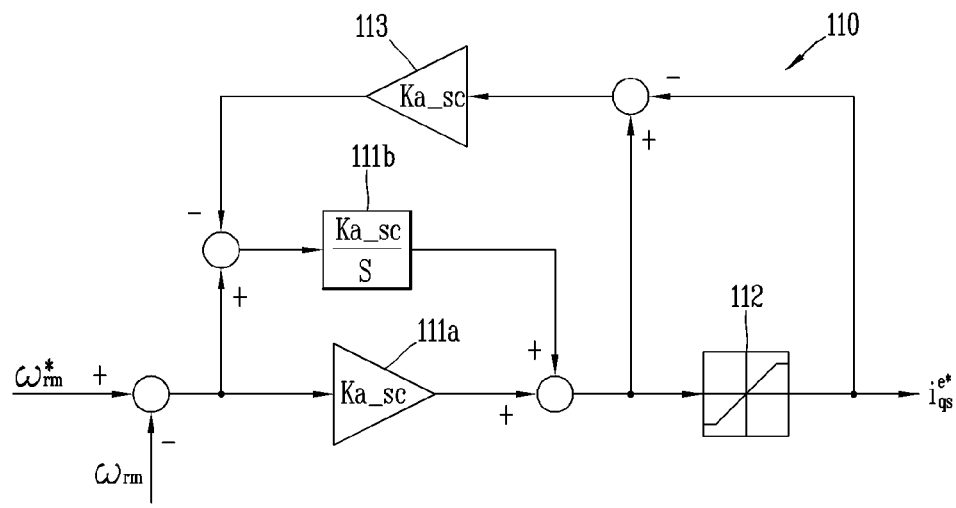
FIG. 2 is a view illustrating a detailed configuration of a speed controller of FIG. 1.

As illustrated, a system for controlling an induction motor to which the present invention is applied, aiming at controlling an induction motor 160, includes a speed controller 110, a current controller 120, a first converting unit 130, a second converting unit 140, an inverter 150, a rotor position detecting unit 170, a magnetic flux angle calculating unit 180, and an estimating device 10 according to an embodiment of the present invention. Other components than the estimating device 10 are the same as those described above with reference to FIG. 1, so a detailed description thereof will be omitted.

The estimating device 10 receives d and q-axis currents in a synchronous reference system and an output voltage from the current controller 120, and outputs an error of rotor resistance. The estimated error of rotor resistance is provided to the current controller 120 and the magnetic flux angle calculating unit 180, so as to be updated.

Figure 5:
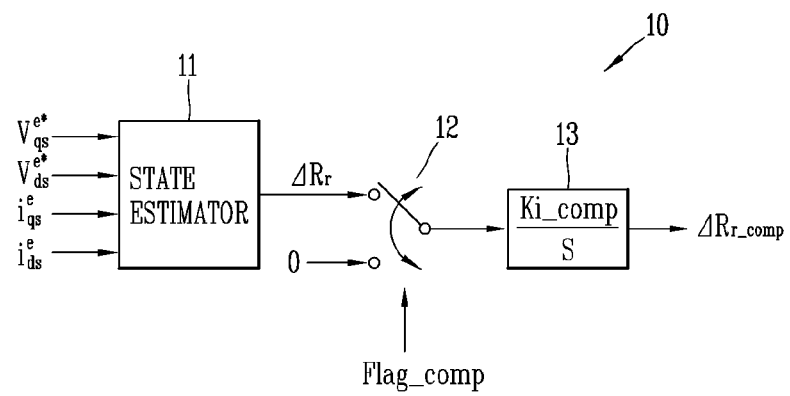
FIG. 5 is a view illustrating a configuration of an estimating device according to an embodiment of the present invention.

FIG. 5 is a view illustrating a configuration of an estimating device according to an embodiment of the present invention.

As illustrated in FIG. 5, the estimating device 10 includes a state estimator 11, a switch 12, and an integral controller 13.

Figure 3A:
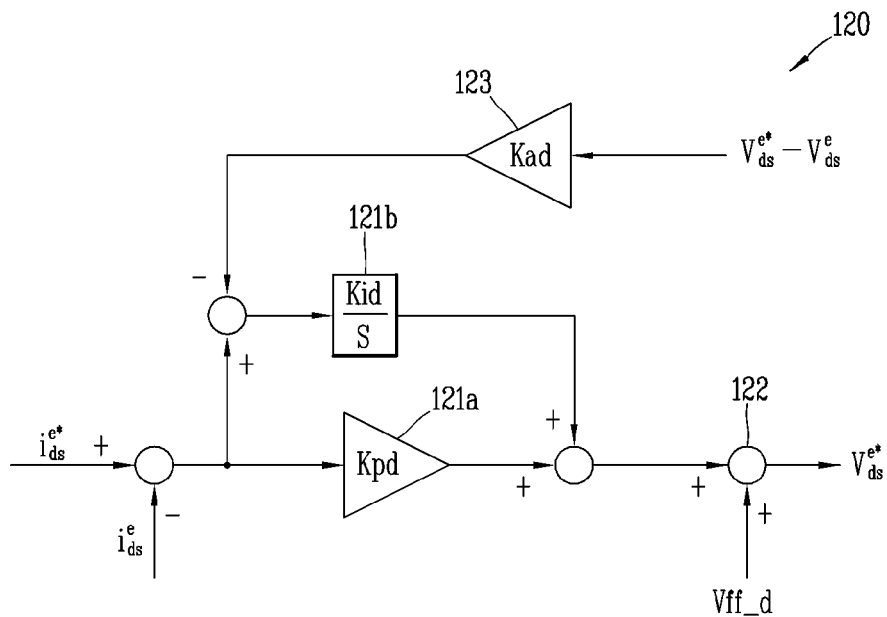
FIGS. 3A and 3B are views illustrating a detailed configuration of a current controller of FIG. 1.
Figure 3B:
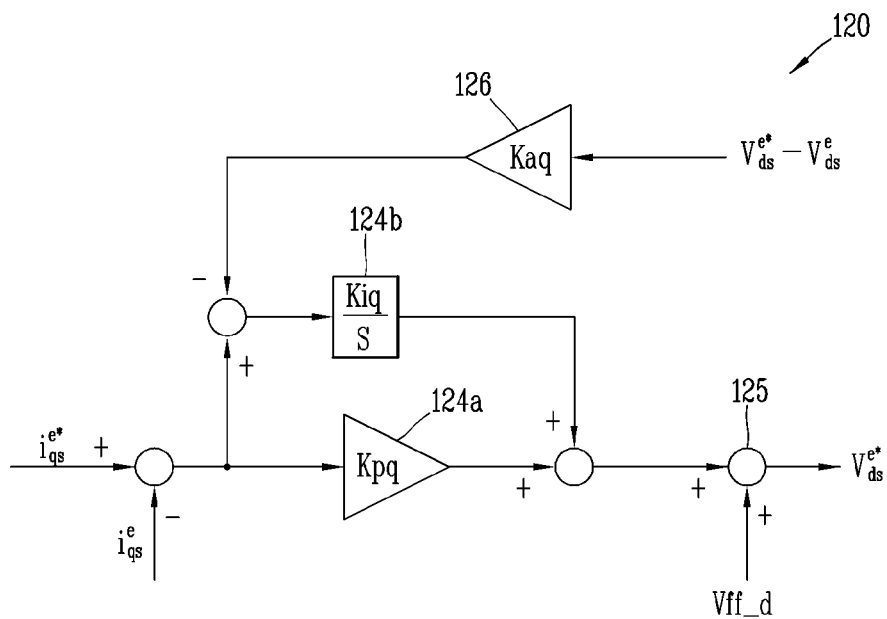

The state estimator 11 calculates an error of rotor resistance by using the output voltages of the d and q-axis current controller 120 as described above with reference to FIGS. 3A and 3B and the feedback current (i.e., d and q-axis currents as outputs from the second converting unit 140).

The switch 12 is operated by a flag for estimating real-time rotor resistance. Namely, whether to estimate rotor resistance is determined according to a flag input. A flag input may be received by a higher control system (not shown).

The integral controller 13 obtains a difference between actual rotor resistance output from the state estimator 11 and nominal rotor resistance.

Hereinafter, an operation of the estimating device 10 according to an embodiment of the present invention will be described.

Voltage equations of the induction motor 160 in a general system of coordinates are the same as Equation 10 to Equation 13, and magnetic flux equations are the same as Equation 14 to Equation 17.

$$V_{ds}^\omega = R_s i_{ds}^\omega + p\lambda_{ds}^\omega - \omega\lambda_{qs}^\omega \quad [\text{Equation 10}]$$

$$V_{qs}^\omega = R_s i_{qs}^\omega + p\lambda_{qs}^\omega + \omega\lambda_{ds}^\omega \quad [\text{Equation 11}]$$

$$V_{dr}^\omega = 0 = R_r i_{dr}^\omega + p\lambda_{dr}^\omega - (\omega - \omega_r)\lambda_{qr}^\omega \quad [\text{Equation 12}]$$

$$V_{qr}^\omega = 0 = R_r i_{qr}^\omega + p\lambda_{qr}^\omega + (\omega - \omega_r)\lambda_{dr}^\omega \quad [\text{Equation 13}]$$

$$\lambda_{ds}^\omega = L_s i_{ds}^\omega + L_m i_{dr}^\omega \quad [\text{Equation 14}]$$

$$\lambda_{qs}^\omega = L_s i_{qs}^\omega + L_m i_{qr}^\omega \quad [\text{Equation 15}]$$

$$\lambda_{dr}^\omega = L_m i_{ds}^\omega + L_r i_{dr}^\omega \quad [\text{Equation 16}]$$

$$\lambda_{qr}^\omega = L_m i_{qs}^\omega + L_r i_{qr}^\omega \quad [\text{Equation 17}]$$

Voltage equations of the induction motor 160 in the synchronous reference frame obtained on the basis of Equation 10 to Equation 17 may be expressed by Equation 18 to Equation 21, and magnetic flux formulas correspond to Equation 22 to Equation 25.

$$V_{ds}^e = R_s i_{ds}^e + p\lambda_{ds}^e - \omega_e \lambda_{qs}^e \quad [\text{Equation 18}]$$

$$V_{qs}^e = R_s i_{qs}^e + p\lambda_{qs}^e + \omega_e \lambda_{ds}^e \quad [\text{Equation 19}]$$

$$0 = R_r i_{dr}^e + p\lambda_{dr}^e - \omega_{sl} \lambda_{qr}^e \quad [\text{Equation 20}]$$

$$0 = R_r i_{qr}^e + p\lambda_{qr}^e \omega_{sl} \lambda_{dr}^e \quad [\text{Equation 21}]$$

$$\lambda_{ds}^e = L_s i_{ds}^e + L_m i_{dr}^e \quad [\text{Equation 22}]$$

$$\lambda_{qs}^e = L_s i_{qs}^e + L_m i_{qr}^e \quad [\text{Equation 23}]$$

$$\lambda_{dr}^e = L_m i_{ds}^e + L_r i_{dr}^e \quad [\text{Equation 24}]$$

$$\lambda_{qr}^e = L_m i_{qs}^e + L_r i_{qr}^e \quad [\text{Equation 25}]$$

By using a rotor magnetic flux and a rotor current, a stator magnetic flux may be expressed as follows.

$$\lambda_{ds}^e = \sigma L_s i_{ds}^e + \frac{L_m}{L_r} \lambda_{dr}^e \quad [\text{Equation 26}]$$

$$\lambda_{qs}^e = \sigma L_s i_{qs}^e + \frac{L_m}{L_r} \lambda_{qr}^e \quad [\text{Equation 27}]$$

Voltage equations of the rotor may be organized on the basis of the foregoing equation as follows.

$$p\lambda_{dr}^e = R_r \frac{L_m}{L_r} i_{ds}^e - \frac{R_r}{L_r} \lambda_{dr}^e + (\omega_e - \omega_r)\lambda_{qr}^e \quad [\text{Equation 28}]$$

$$p\lambda_{qr}^e = R_r \frac{L_m}{L_r} i_{qs}^e - \frac{R_r}{L_r} \lambda_{qr}^e - (\omega_e - \omega_r)\lambda_{dr}^e \quad [\text{Equation 29}]$$

Also, d and q-axis voltage equations in the synchronous reference frame of the stator of the induction motor 160 may be expressed as follows.

$$V_{ds}^e = \left(R_s + R_r \frac{L_m^2}{L_r^2}\right) i_{ds}^e + \sigma L_s \frac{d i_{ds}^e}{dt} - \omega_e \sigma L_s i_{qs}^e - R_r \frac{L_m}{L_r^2} \lambda_{dr}^e \quad [\text{Equation 30}]$$

$$V_{qs}^e = \left(R_s + R_r \frac{L_m^2}{L_r^2}\right) i_{qs}^e + \sigma L_s \frac{d i_{qs}^e}{dt} + \omega_r L_s i_{ds}^e + \frac{R_r}{L_r} \sigma L_s i_{qs}^e \quad [\text{Equation 31}]$$

While indirect vector control is being performed and current is being controlled in a normal state, outputs from the current controller 120 are as follows.

$$V_{ds\_out}^e = \left(K_p + \frac{K_I}{s}\right)(i_{ds}^{e*} - i_{ds}^e) + V_{ds\_ff1}^e + V_{ds\_ff2}^e \quad [\text{Equation 32}]$$

$$V_{qs\_out}^e = \left(K_p + \frac{K_I}{s}\right)(i_{qs}^{e*} - i_{qs}^e) + V_{qs\_ff1}^e + V_{qs\_ff2}^e \quad [\text{Equation 33}]$$

Here, feed-forward items are defined as follows.

$$V_{ds\_ff1}^e = -\omega_e \sigma \hat{L}_s i_{qs}^e \quad [\text{Equation 34}]$$

$$V_{ds\_ff2}^e = -\hat{R}_r \frac{\hat{L}_m}{\hat{L}_r^2} \lambda_{dr}^e \quad [\text{Equation 35}]$$

$$V_{qs\_ff1}^e = \omega_r \hat{L}_s i_{ds}^e \quad [\text{Equation 36}]$$

$$V_{qs\_ff2}^e = -\frac{\hat{R}_r}{\hat{L}_r} \sigma \hat{L}_s i_{qs}^e \quad [\text{Equation 37}]$$

If current control is smoothly performed by the current controller 120, the following conditions are satisfied.

$$V_{ds}^e = V_{ds\_out}^e \quad [\text{Equation 38}]$$

$$V_{qs}^e = V_{qs\_out}^e \quad [\text{Equation 38}]$$

Here, in a case in which inductance is accurate, voltages output by the d and q-axis current controller in a normal state are as follows.

$$\left(K_p + \frac{K_I}{s}\right)(i_{ds}^{e*} - i_{ds}^e) \cong \frac{K_I}{s}(i_{ds}^{e*} - i_{ds}^e) = \quad [\text{Equation 40}]$$

$$\left(R_s + R_r \frac{L_m^2}{L_r^2}\right) i_{ds}^e + \hat{R}_r \frac{L_m}{L_r^2} \lambda_{dr}^e - R_r \frac{L_m}{L_r^2} \lambda_{dr}^e$$

$$\left(K_p + \frac{K_I}{s}\right)(i_{qs}^{e*} - i_{qs}^e) \cong \frac{K_I}{s}(i_{qs}^{e*} - i_{qs}^e) = \quad [\text{Equation 41}]$$

$$\left(R_s + R_r \frac{L_m^2}{L_r^2}\right) i_{qs}^e - \frac{\hat{R}_r}{\hat{L}_r} \sigma \hat{L}_s i_{qs}^e + \frac{R_r}{L_r} \sigma L_s i_{qs}^e$$

Equation 40 and Equation 41 may be organized as follows.

$$\frac{K_I}{s}(i_{ds}^{e*} - i_{ds}^e) = \left(R_s + R_r\frac{L_m^2}{L_r^2}\right)i_{ds}^e + \Delta\hat{R}_r\frac{L_m^2}{L_r^2}i_{ds}^e \quad \text{[Equation 42]}$$

$$\frac{K_I}{s}(i_{qs}^{e*} - i_{qs}^e) = \left(R_s + R_r\frac{L_m^2}{L_r^2}\right)i_{qs}^e - \frac{\Delta\hat{R}_r}{L_r}\sigma L_s i_{qs}^e \quad \text{[Equation 43]}$$

Equation 42 and Equation 43 may be substituted as follows.

$$\frac{K_I}{s}(i_{ds}^{e*} - i_{ds}^e) = M \quad \text{[Equation 44]}$$

$$\frac{K_I}{s}(i_{qs}^{e*} - i_{qs}^e) = N \quad \text{[Equation 45]}$$

$$R_s + R_r\frac{L_m^2}{L_r^2} = A \quad \text{[Equation 46]}$$

$$\frac{L_m^2}{L_r^2} = m \quad \text{[Equation 47]}$$

$$\frac{\sigma L_s}{L_r} = k \quad \text{[Equation 48]}$$

Substituted equations may be organized as follows.

$$M = Ai_{ds}^e + \Delta R_r m i_{ds}^e \quad \text{[Equation 49]}$$

$$N = Ai_{qs}^e - \Delta R_r k i_{qs}^e \quad \text{[Equation 50]}$$

When the above simultaneous equations are obtained, an error of rotor resistance can be obtained as follows.

$$\Delta R_r = \frac{Mi_{qs}^e - Ni_{ds}^e}{(m+k)i_{ds}^e i_{qs}^e} \quad \text{[Equation 51]}$$

The integral controller 13 of FIG. 5 is operated until when the value calculated by Equation 51 reaches zero (0), and the estimated error of the rotor resistance is continuously updated in the feed-forward of Equation 35 and Equation 37 and the calculation of the slip frequency of Equation 7, so as to be calculated as expressed by Equation 52.

$$\omega_{sl} = \frac{\hat{R}_r + \Delta R_{r\_comp}}{L_r}\frac{i_{qs}^e}{i_{ds}^{e*}} \quad \text{[Equation 52]}$$

The rotor resistance may be obtained by using the result of Equation 51. The output $\Delta R_{r\_comp}$ from the integral controller 13 is converged on a certain value when $\Delta R_r$ is 0, and in this case, Equation 42 and Equation 43 may be organized as follows.

$$\frac{K_I}{s}(i_{ds}^{e*} - i_{ds}^e) = \left(R_s + R_r\frac{L_m^2}{L_r^2}\right)i_{ds}^e \quad \text{[Equation 53]}$$

$$\frac{K_I}{s}(i_{qs}^{e*} - i_{qs}^e) = \left(R_s + R_r\frac{L_m^2}{L_r^2}\right)i_{qs}^e \quad \text{[Equation 54]}$$

Here, the rotor resistance may be expressed as follows.

$$R_r = \hat{R}_e + \Delta R_{r\_comp} \quad \text{[Equation 55]}$$

Thus, the stator resistance may be obtained by using Equation 56 or Equation 57. However, although not shown in FIG. 5, the estimating device 10 according to an embodiment of the present invention may further include a stator resistance calculating unit (not shown) to calculate stator resistance as follows.

$$R_s = \frac{M}{i_{ds}^e} - (\hat{R}_r + \Delta R_{r\_comp})\frac{L_m^2}{L_r^2} \quad \text{[Equation 56]}$$

$$R_s = \frac{N}{i_{qs}^e} - (\hat{R}_r + \Delta R_{r\_comp})\frac{L_m^2}{L_r^2} \quad \text{[Equation 57]}$$

As described above, real-time estimation of the rotor resistance and stator resistance of the induction motor 160 may be performed by using feed-forward of the current controller 120 and an output voltage from an integrator of the current controller 120. Since performance of the system for controlling an induction motor is determined by a control bandwidth of the current controller having the fastest dynamic characteristics, the estimated rotor resistance and stator resistance have very fast dynamic characteristics and are simple.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for estimating a parameter of an induction motor including a current controller outputting d and q-axis voltages in a synchronous reference frame from d and q-axis current references and d and q-axis currents in the synchronous reference frame applied to the induction motor and a magnetic flux angle calculating unit calculating a magnetic flux angle by using d and q-axis currents in the synchronous reference frame applied to the induction motor and a rotor speed of a rotor of the induction motor, in a control system, the apparatus comprising:

a state estimator configured to calculate an error value of a rotor resistance based on an output received from the current controller and the d and q-axis currents in the synchronous reference frame applied to the induction motor; and an integral controller configured to:
obtain a difference value between an actual rotor resistance based on the calculated error value received from the state estimator and a nominal rotor resistance; and
output the difference value to the current controller and the magnetic flux angle calculating unit.

2. The apparatus of claim 1, further comprising:
a stator resistance calculating unit configured to calculate a stator resistance based on the obtained difference value obtained by the integral controller.

3. The apparatus of claim 1, further comprising:
a switch configured to change the error value received by the integral controller according to a flag input.

4. The apparatus of claim 1, wherein the output from the integral controller is received by the current controller and the magnetic flux angle calculating unit to update a rotor resistance value.

5. The apparatus of claim 2, wherein the stator resistance calculating unit calculates the stator resistance by using the following equations:

$$R_s = \frac{M}{i_{ds}^e} - (\hat{R}_r + \Delta R_{r\_comp})\frac{L_m^2}{L_r^2}; \text{ and}$$

$$R_s = \frac{N}{i_{qs}^e} - (\hat{R}_r + \Delta R_{r\_comp})\frac{L_m^2}{L_r^2}$$

wherein:

$R_s$ is the stator resistance, $R_r$ is the rotor resistance, $$M = \frac{K_I}{s}(i_{ds}^{e*} - i_{ds}^e), \quad N = \frac{K_I}{s}(i_{qs}^{e*} - i_{qs}^e),$$

and $\Delta R_{r\_comp}$ are outputs from the integral controller, $L_m$ is an inductance of the induction motor, and $L_r$ is a rotor inductance.

* * * * *